July 5, 1938.   K. E. PEILER   2,123,145
DEVICE FOR BLOWING AND COOLING GLASSWARE
Filed Oct. 30, 1936
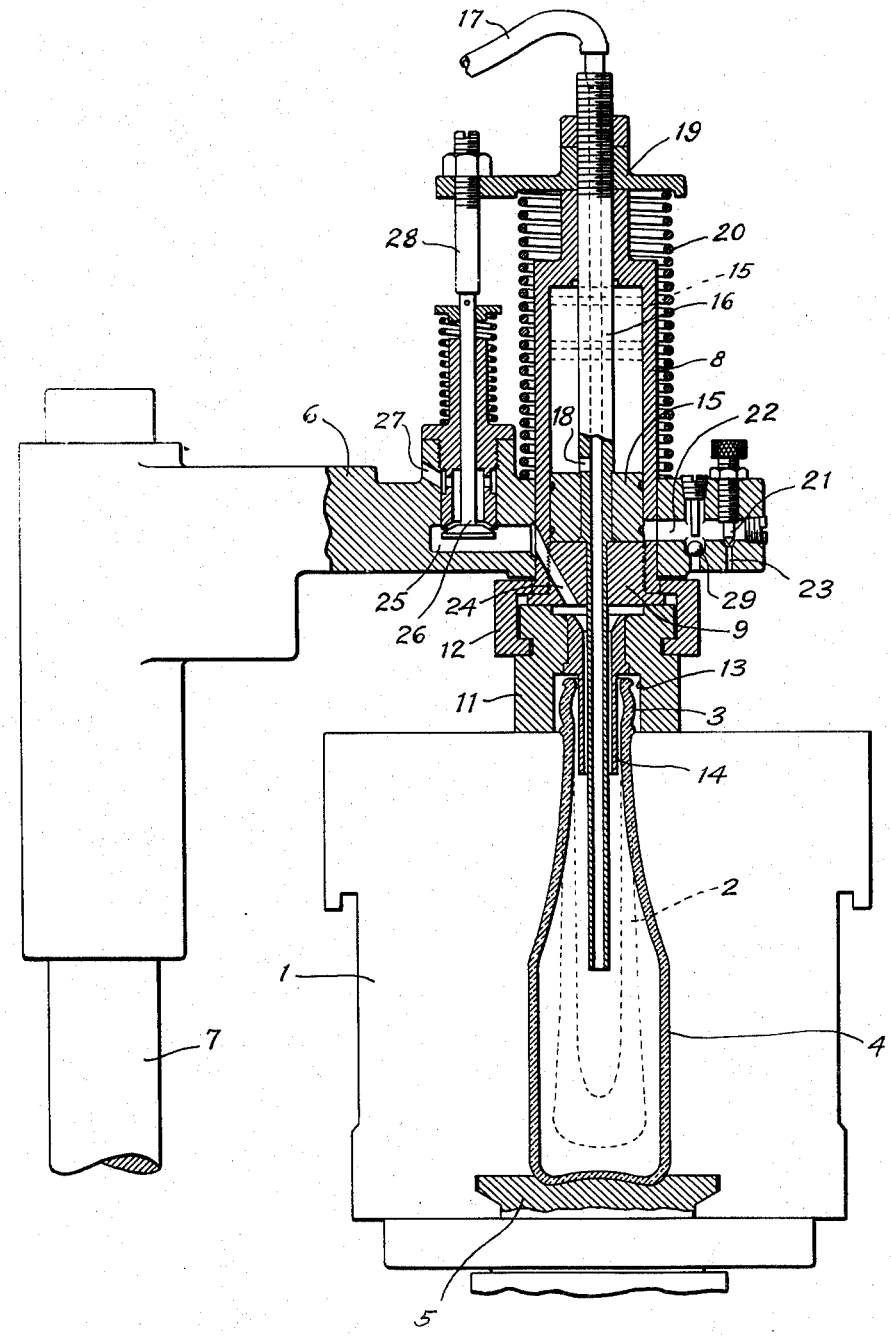
Witness:
A. A. Horn
Inventor:
Karl E. Peiler
by Brown & Parham
Attorneys.

Patented July 5, 1938

2,123,145

UNITED STATES PATENT OFFICE 2,123,145

DEVICE FOR BLOWING AND COOLING GLASSWARE

Karl E. Peiler, West Hartford, Conn., assignor to Hartford-Empire Company, Hartford, Conn., a corporation of Delaware Application October 30, 1936, Serial No. 108,394

7 Claims. (Cl. 49—18)

This invention relates to devices for blowing and internally cooling articles of glassware in the molds in which the ware is given its final shape, and the invention has for its general object the provision of a novel device of this type which is of simple construction but which operates to effect the removal of heat from the glassware more rapidly and more uniformly than similar devices heretofore proposed.

The purpose of providing for the internal cooling of an article of glassware, such as a bottle, while the article is contained in the finishing mold and is being cooled externally thereby, is to cool the ware more rapidly and more evenly than is possible merely by relying upon the cooling effect of the mold. Thus the productivity of the finishing mold may be increased and the quality of the ware improved.

The devices heretofore designed for internal cooling of glassware have, however, certain objections or disadvantages as a result of which they have not been used to any great extent in the practical art, or if used, have not accomplished the intended purpose in a simple and efficient manner.

One type of internal cooling means of the prior art is objectionable because of the necessity for providing special mechanism separate from the blowing mechanism for internal cooling, which cannot operate to maintain a continuous pressure in the ware. Not only is internal cooling delayed by the cooling effect of the mold, but it is reduced and made non-uniform by the shrinkage of the glass, destroying its contact or even contact with the mold.

Another type of internal cooling device is objectionable because of the escape and waste of air during the blowing operation or initial application of the air which makes the device uneconomical in operation.

Another type of blowing and cooling device has the objection that the current of cooling air provided for internal cooling is directed against the neck finish of the articles, which, having already been sufficiently chilled, are thereupon excessively chilled with objectionable effects upon the glassware.

It is an object of the present invention to provide a simple and compact device which serves both the purpose of a blow head and internal ware cooling means, and which is so constructed and operated as to overcome the above objections to the prior art mechanisms.

A more specific object of the present invention is to provide a novel combination blow head and internal cooling mechanism which is adapted to apply a selected blowing pressure and maintain such pressure in a hollow article without the escape or waste of air for a period of time which may be predetermined by the operative and which then permits the interior of the article to effect internal cooling thereof under sufficient pressure, however, to continue without interruption the efficient and uniform external absorption of heat by the mold.

Another object of the invention is to provide novel mechanism for blowing and internally cooling glassware so constructed as to protect the neck or neck finish of the ware from the cooling medium to prevent undue chilling thereof.

A further object of the invention is to provide a novel mechanism for blowing and internally cooling glassware which operates automatically in response to the turning on of the blowing air to initiate exhaust of air for internal cooling after air under full pressure has been applied to the ware for a predetermined time interval.

Other objects and advantages of the invention will be pointed out in the following description of an embodiment thereof disclosed in the accompanying drawing, in which drawing the single figure is a view in vertical sectional elevation of such embodiment.

Referring to the drawing, I have shown a blowing and cooling mechanism associated with a blow mold 1 adapted to receive a blank indicated at 2 and having a neck finish 3. The blank is to be blown into a finished article as indicated at 4, the bottom of which is formed by the usual bottom closure 5. Although the production of a narrow neck bottle is illustrated, it will be understood that the invention may be embodied in any type of glassware forming machine operating on the blank or parison system.

The blowing and cooling device comprises a casing 6 which is carried on the upper end of a shaft 7 which may be raised and lowered by suitable automatic mechanism (not illustrated) for moving the device into and out of cooperative relation with the finishing mold 1.

The casing 6 has mounted therein a cylinder 8, the lower end of which is closed by head 9, to which head the blow head or cap 11 is secured by clamping means 12. The blow head 11 has air-tight engagement with mold 1 and is recessed as shown at 13, so as to enclose the neck finish 3 without touching said finish. It is desirable to avoid having any metal touch the neck finish in the finish blowing operation because that would unduly chill the finish and cause checks or other defects.

The head 11 has mounted therein a sleeve 14 which projects a substantial distance into the neck finish and neck of the parison or final article to protect it from the circulating cooling air as hereinafter explained. This sleeve may be made as large in diameter as possible without, however, touching the glass.

My novel mechanism preferably includes pneumatic means so constructed that by merely opening a valve controlling the supply of blowing air, blowing air is supplied at its selected full pressure for a predetermined period of time, an internal cooling tube is lowered into the cavity of the hollow article during such period and the blowing under full pressure is ended and the circulation of air initiated simultaneously by the opening of an exhaust valve. The parts which accomplish these results will now be described.

Mounted within the cylinder 8 is a piston 15 through which extends an air delivery tube 16, the lower portion of which is guided through the cylinder head 9 downwardly through the sleeve 14 to deliver blowing and cooling air, as hereinafter described. The upper end of the tube 16 serves as a piston rod and also as an air conduit having hose connection 17 on its outer end which leads to a suitable source of blowing air (not shown). The tube 16 is provided with a port 18 just above piston 15 to admit air pressure above the piston and force it downwardly to lower the tube 16 into position to deliver internal cooling air. Tube 16 serves to deliver the air for blowing as it descends, and the same air for cooling when it reaches its lowest position.

The descent of piston 15 and tube 16 is controllably retarded by means which include a compression spring 20 which acts upon cross-head 19 to retard the downward movement of the piston, and a regulating needle valve 21 for restricting the flow of air from beneath the piston through passage 22 and exhaust outlet 23. By adjusting the needle valve 21, the period during which the blowing air is maintained in the finished article at full pressure and before it is allowed to escape for internal cooling, may be predetermined in accordance with the type of article being produced and the quantity of heat it is desired to absorb from the article by the mold in this stage of the operation. The delay in the lowering of the tube 16 has two advantages: First, the initial blowing air is delivered into the top of the parison cavity, and second, the tube is prevented from touching the glass.

As piston 15 reaches the bottom of cylinder 8 and tube 16 is brought into the proper position to deliver cooling air, a restricted exhaust from within the bottle 4 is established through sleeve 14, passageways 24 and 25, past a valve 26 and through the vent 27. Thus, there is no interruption in the application of the pressure internally of the article and no interruption in the uniform absorption of heat by the mold; all that is necessary is to open valve 26 for the escape of air from within the article and although this causes a drop in pressure, the valve restricts the exhaust sufficiently to maintain a high pressure in the bottle which keeps it in intimate contact with the mold.

The valve 26 is cracked to permit the escape of air by means of a push rod 28 on the cross-head 19, push rod 28 being adjusted to crack the valve at the end of the stroke of piston 15. The cooling air flows downwardly through tube 16 toward and against the bottom of the bottle and upwardly along its sides, but is directed away from the upper part of the neck and the neck finish by the protecting sleeve 14 which delivers the cooling air to passage 25. It will be understood that there will be a certain amount of turbulence in the bottle which increases the removal of heat.

This flow of internal cooling air is continued for a desired period of time which will depend upon the amount of heat which it is desired to remove internally by such air and externally by the mold, and will be terminated automatically merely by cutting off the supply of air to the hose 17 which will permit the spring 20 to raise piston 15 to its uppermost dotted line position and withdraw tube 16 from within the bottle. The piston 15 is permitted to move upwardly without appreciable resistance by the opening of a check valve 29 provided in the casing 8 to admit air beneath the piston. Thus the blowing and cooling device may be disengaged from the mold 1 immediately after the supply of air through connection 17 is cut off.

It will be seen that I have provided a compact and efficient mechanism which serves both as a finish blow head and internal cooling device, and which is adapted to blow and cool the glass internally while maintaining a high pressure therein and without objectionable cooling effect upon the neck and neck finish of the ware.

Various changes may be made in the details of construction and operation of the device embodying my invention without departing from the scope of the claims. For example, instead of using the blowing air for internally cooling the ware, other gas or vapor, such as steam, may be employed by connecting the air delivery hose or connection 17 with a source of such vapor or gas (not shown) preferably before or at the time of opening of exhaust valve 26. Or, if desired, water vapor or spray may be introduced into the ware together with the air to assist in the cooling operation. Also, gas or vapor other than air may be used for the blowing operation. Therefore, the word "air" as used in the claims is to be construed as the equivalent of "gas", "vapor", "steam" or other "elastic fluid" suitable for blowing or internally cooling glassware while maintaining it under pressure, whether used alone or mixed or containing drops of water or atomized water.

Having thus described my invention, what I claim is:

1. A device for blowing and internally cooling hollow articles of glassware in a mold comprising a casing, a blow head supported by said casing and adapted for air-tight engagement with said mold, a conduit for supplying blowing air through said casing and blow head to blow an article in said mold, an exhaust passage in said casing communicating with the interior of said article, a normally closed valve in said passage, and timing means acting automatically after the application of blowing air has been maintained in said article for a predetermined period of time for opening said valve to exhaust air from said article to effect internal cooling thereof.

2. A device for blowing and internally cooling hollow articles of glassware in a mold adapted for air-tight engagement with said mold and comprising a tube for supplying blowing air when said tube is in raised position to blow an article in said mold, means for lowering the tube into the interior of said article after it has been expanded by said blowing air to deliver cooling air in said article, said last-mentioned means including means for timing the descent of said tube to occur after expansion of said article by air delivered through said tube, and means for exhausting air from said article including a sleeve projecting into but out of contact with said article for protecting the neck finish of said article from the flow of cooling air.

3. A device for blowing and cooling articles of glassware in a mold comprising a casing adapted for air-tight engagement with said mold, a conduit for the passage of blowing air through said casing to blow an article in said mold, a valve for controlling the exhaust of air from within said article, and pneumatic means responsive to the passage of air through said conduit for opening said valve.

4. A device for blowing and cooling articles of glassware in a mold comprising a casing, a blow head supported by said casing and adapted for air-tight engagement with said mold, a tube for delivering air through said casing and blow head to blow an article in said mold, a passage in said casing for exhausting air from the interior of said article to cool it, a sleeve in said blow head having communication with said passage and projecting into but out of contact with the neck finish of the article to protect it from the flow of cooling air, a valve in the passage, and pneumatic means responsive to the passage of air through said conduit for opening said valve and adapted to lower said tube into the interior of said article.

5. A device for blowing and cooling articles of glassware in a mold comprising an air delivery tube, means supporting said tube in position for movement into and out of an article of glassware, and means responsive to the delivery of air to said tube for lowering it into said article.

6. A device for blowing and cooling articles of glassware in a mold comprising an air delivery tube, means supporting said tube in position for movement into and out of an article of glassware, and means responsive to the turning on and off of air in said tube for lowering said tube into and withdrawing it out of said article.

7. A device for blowing and internally cooling hollow articles of glassware comprising a casing, a blow head supported by the casing, a cylinder mounted in the casing, a piston in said cylinder, a tube in said piston for the delivery of air to blow and cool an article in said mold, an exhaust passage in said casing having a valve therein, a sleeve projecting from the blow head into but out of contact with the neck finish of said article for the exhaust of air from the interior thereof, a spring yieldingly holding said piston and tube in raised position, means of communication between the tube and the cylinder above the piston whereby the passage of air through said tube forces the piston downwardly, means operated by said piston for opening said valve near the end of its downward stroke, and means for adjusting the period of the downward stroke of said piston.

KARL E. PEILER.